United States Patent [19]

Shimomura et al.

[11] Patent Number: 4,511,711
[45] Date of Patent: Apr. 16, 1985

[54] PROCESS FOR PRODUCING SEMIPERMEABLE MEMBRANE

[75] Inventors: Takatoshi Shimomura, Ibaraki; Fumio Fujita, Osaka; Manabu Hirakawa, Ibaraki, all of Japan

[73] Assignee: Sumitomo Chemical Company, Limited, Osaka, Japan

[21] Appl. No.: 463,243

[22] Filed: Feb. 2, 1983

[30] Foreign Application Priority Data

Feb. 10, 1982 [JP] Japan .................................. 57-20316
Feb. 12, 1982 [JP] Japan .................................. 57-21633

[51] Int. Cl.$^3$ .............................................. C08F 6/00
[52] U.S. Cl. ............................... 528/489; 204/159.14; 204/165; 210/500.2; 528/492
[58] Field of Search ............................... 528/489, 488; 204/159.14, 165; 525/369, 329.1, 329.2, 368

[56] References Cited

U.S. PATENT DOCUMENTS

| | | | |
|---|---|---|---|
| 3,127,233 | 3/1964 | Lowes | 528/489 |
| 3,615,024 | 10/1971 | Michaels | 210/490 |
| 4,268,662 | 3/1981 | Sano | 528/488 |
| 4,323,627 | 4/1982 | Joh | 210/500.2 |
| 4,409,162 | 10/1983 | Takao | 210/500.2 |

*Primary Examiner*—Christopher A. Henderson
*Attorney, Agent, or Firm*—Stevens, Davis, Miller & Mosher

[57] ABSTRACT

A process for producing a semipermeable membrane having a high flux, excellent in solute rejection and useful for reverse osmosis, ultrafiltration and the like which comprises dipping a semipermeable membrane of acrylonitrile polymer containing 40–100% by mole of acrylonitrile in a solution of an amine and/or an alkali, or casting a solution of said polymer containing an amine and/or an alkali to prepare a semipermeable membrane, and optionally, treating the semipermeable membrane thus obtained with plasma.

2 Claims, No Drawings

PROCESS FOR PRODUCING SEMIPERMEABLE MEMBRANE

The present invention relates to a process for improving semipermeable membranes comprising an acrylonitrile polymer used for reverse osmosis, ultrafiltration or the like. More particularly, it relates to a process for improving semipermeable membranes so as to increase water permeability (hereinafter, referred to as "flux") without damaging the solute rejection of the membranes.

Recently, a reverse osmosis or ultrafiltration process using semipermeable membranes made of cellulose acetate, polyamide or the like is widely used in various fields such as production of fresh water from sea water, treatment of waste water, control of electrodeposition bath, the food industry and the medical industry. What is important in these separation processes using membranes is the selective permeability of the membranes, i.e. solute rejection and flux. Particularly, it is not too much to say that the quantity of flux is a factor determining the economic value of the processes.

To date, a large number of studies have been made to increase the flux of semipermeable membranes used for reverse osmosis and ultrafiltration, and even the studies reported in patents and papers are too numerous to enumerate. Many of the studies are closely related to a membrane casting process, so that it may be said that the studies to increase the flux of semipermeable membranes are equivalent to a study of said process.

Of these studies, typical ones may be a study for producing asymmetric membranes having active surface skin layers of the smallest possible thickness, a study for producing an ultrathin membrane corresponding to the active surface skin layer followed by backing the membrane on a porous support into a composite, and the like. Although these studies may be a regular approach to the improvement of flux, it is not always true that they provide a general and more practical method.

On the other hand, it is well known that acrylonitrile copolymers are a raw material for the production of semipermeable membranes. Although many trials have been made to produce semipermeable membranes of acrylonitrile since the process disclosed in Japanese Patent Kokai (Laid-Open) No. 6,257/72, the membranes produced from acrylonitrile polymers are low in solute rejection in spite of their large flux as mentioned in Japanese Patent Kokai (Laid-Open) No. 3,971,75. Particularly when the solute is sodium chloride which is a low molecular weight electrolyte, they are said to exhibit an extraordinarily low rejection.

This is the reason why semipermeable membranes of acrylonitrile polymer cannot be used for reverse osmosis, even though they may find a practical application in ultrafiltration.

Previously, in view of the good film forming property, thermal resistance, acid resistance and alkali resistance of acrylonitrile polymers, the inventors extensively studied a process for producing semipermeable membranes capable of rejecting even low molecular electrolytes such as sodium chloride at a high rate. As a result, the inventors succeeded in producing semipermeable membranes of acrylonitrile polymer having better thermal, mechanical and chemical properties and higher solute rejection than those of the conventional cellulose acetate membranes when used for reverse osmosis, by the epoch-making process of plasma-treatment of porous membranes of acrylonitrile polymer (Japanese Patent Publication No. 38,988/77). This process brought about a great advance never attainable by the prior art into the field of semipermeable membranes of acrylonitrile polymer.

The inventors continued a further study to improve the performances of semipermeable membranes of various acrylonitrile polymers including plasma-treated ones. As the result, the inventors found that these semipermeable membranes of acrylonitrile polymers can remarkably be improved in the flux without largely damaging their solute rejection by dipping them in a solution of an amine and/or an alkali, or by treating them with plasma after the dipping treatment, or, when semipermeable membranes of acrylonitrile polymer are produced by wet casting process, by adding an amine and/or an alkali to the solution to be cast or by treating the semipermeable membrane thus obtained with plasma. The present invention is based on this finding.

It is the object of the present invention to provide a process for producing semipermeable membranes excellent in solute rejection and high in flux by dipping a semipermeable membrane of acrylonitrile polymer in a solution of an amine and/or an alkali, or by thereafter treating the membrane with plasma, or, when a semipermeable membrane of acrylonitrile polymer is produced by wet casting process, by adding an amine and/or an alkali to the solution to be cast or by treating the semipermeable membrane thus obtained with plasma.

It is well known that, if an acrylonitrile polymer is dissolved in N,N-dimethylformamide, mixed with an amine or an alkali and then left standing, it is colored brown. The colored substance is considered to appear due to the formation of naphthylidine ring. It is considered that, in the process of the invention, naphthylidine ring is similarly formed by carrying out the same treatment or by dipping a semipermeable membrane of acrylonitrile polymer in a solution of amine or alkali. This formation of naphthylidine ring is believed to provide the improvement of flux without damaging solute rejection.

Hereunder, the embodiment of the present invention will be illustrated in detail.

The acrylonitrile polymer constituting the semipermeable membranes used in the present invention includes polyacrylonitrile and various types of copolymers containing acrylonitrile monomer as a component, both of which can be produced by the well-known methods. As comonomers constituting the copolymers together with acrylonitrile, there can be mentioned various well-known nonionic and ionic monomers copolymerizable with acrylonitrile. For example, the nonionic monomers include acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate, vinyl chloride, styrene and the like. The ionic monomers include acrylic acid, methacrylic acid, ethylenesulfonic acid, methallylsulfonic acid, sulfopropyl methacrylate, vinylbenzenesulfonic acid; methallic salts thereof; tertiary amines such as 2-vinylpyridine, 4-vinylpyridine and dimethylaminoethyl methacrylate; and salts of quaternary amines obtainable by alkylating the tertiary amines.

As referred to in the present invention, the term "acrylonitrile polymer" means a copolymer comprising at least 40% by mole of acrylonitrile and 60–0% by mole of at least one comonomer mentioned above. If the percentage of acrylonitrile is less than 40% by mole, the effect of the invention cannot be exhibited, so that practical value is not recognized.

Accordingly, as the acrylonitrile polymer usable in the invention, acrylonitrile copolymers containing 40% by mole or more of acrylonitrile are preferable, and those containing 70-95% by mole of acrylonitrile are particularly preferable.

Molecular weight of the polymers is preferably 5,000-5,000,000 from the viewpoint of sufficiency of membrane mechanical strength.

When a semipermeable membrane of acrylonitrile polymer is dipped in a solution of amine and/or alkali in the process of the invention, the semipermeable membrane of acrylonitrile polymer is not particularly limited in the process of production. However, particularly preferable membranes are a semipermeable membrane produced by wet casting process comprising usual casting process of solution, partial evaporation of solvent and gelation and a semipermeable membrane obtained by further treating, with hot water, the porous membrane obtained by wet casting process.

These semipermeable membranes have various shapes such as flat film, tube, hollow fiber, string-form, composite with other porous support and so on, which all can be used in the process of the invention.

One example of the wet casting process preferably used in the invention is as follows. First of all, polyacrylonitrile or an acrylonitrile copolymer is dissolved into solvent only or a mixture of solvent and additives so that the polymer concentration reaches 5-30% by weight. When amine or alkali is to be added, they are then added and dissolved.

As the solvent, an aqueous solution of inorganic salt or a polar organic solvent such as N,N-dimethylacetamide, N,N-dimethylformamide, dimethyl sulfoxide and the like is used.

As the additive, polyols such as polyethylene glycol, polypropylene glycol and the like are used, among which polyethylene glycol having an average molecular weight of 100-2,000 is particularly preferable. It is indispensable that the amount of said additive falls in the range where the additive is mutually soluble with the polymer solution. Preferable amount of said additive is 5-20% by weight based on the total weight of polymer solution.

Subsequently, the polymer solution is cast on a glass plate with a doctor blade.

Temperature of the casting may be a temperature where the casting is possible. Preferable range of casting temperature is 10° C. to 80° C.

Thickness of the cast solution has a relation with thickness of semipermeable membrane.

Accordingly, thickness of cast solution is usually controlled so as to form a semipermeable membrane having a thickness of about 100μ. The cast solution is dipped into non-solvent either immediately or after evaporating the solvent at the surface of solution for a while.

Preferably, the time period of evaporating the solvent is 0-60 minutes, and temperature of the evaporation is the range from 0° C. to boiling point of the solvent. Then, the cast solution from which the solvent at surface has been partially evaporated or the cast solutoin not subjected to evaporation process at all is dipped in nonsolvent and made to gel. As the nonsolvent, water or a mixture of water and organic solvent is used.

The amine used in the invention is not critical, but all the substances extensively known as amine can be used. As used in the invention, the term "amines" means a series of compounds shown below which include quaternary ammonium salts, too. Thus, for example, they include compounds represented by the following general formula:

wherein $R_1$, $R_2$ and $R_3$ are H, $C_{1-18}$ alkyl group, phenyl group, aralkyl group or cyclohexyl group, compounds represented by the following general formula:

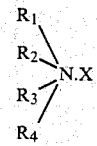

wherein $R_1$, $R_2$, $R_3$ and $R_4$ are H, $C_{1-18}$ alkyl group, phenyl group, aralkyl group or cyclohexyl group, and X is halogen, as well as alkanolamines, hydroxylamines and the like.

Concrete examples of said amine include ammonia, methylamine, dimethylamine, trimethylamine, ethylamine, diethylamine, triethylamine, n-propylamine, isopropylamine, n-butylamine, di-n-butylamine, tri-n-butylamine, iso-butylamine, di-iso-butylamine, tri-iso-butylamine, t-butylamine, di-t-butylamine, tri-t-butylamine, laurylamine, stearylamine, aniline, diphenylamine, methylaniline, cyclohexylamine, their quaternary salts with inorganic acids, their quaternary salts with alkyl halide, ethanolamine, diethanolamine, triethanolamine and the like. Among them, preferable amines are dimethylamine, trimethylamine, diethylamine, triethylamine, n-propylamine, n-butylamine, di-n-butylamine, tri-n-butylamine, iso-butylamine, di-iso-butylamine, tri-iso-butylamine, t-butylamine, di-t-butylamine, tri-t-butylamine, ethanolamine, diethanolamine, triethanolamine and the like.

Though the alkali usable in the invention is not critical, hydroxides of alkali metals are preferable. Concretely, sodium hydroxide, potassium hydroxide and the like can be mentioned.

When a semipermeable membrane of acrylonitrile polymer is dipped in a solution of amine and/or alkali in the invention, liquid amines may be used as they are. When the amines are used in the form of a solution, concentration of the amines is not critical, but a concentration at which the membrane of acrylonitrile polymer is colored may be used, though the concentration may be dependent also on the kind of amine or alkali. Solvent for preparing the solution is not critical, though water, alcohols and ketones are preferable. Particularly preferable solvents for this purpose are water, methanol, ethanol, propanol, acetone and methyl ethyl ketone.

Temperature, time period and pressure of the dipping treatment are not critical.

When an amine and/or an alkali is added to the casting solution containing acrylonitrile polymer of the invention, the amount of amine and/or alkali may be an amount enough to form a naphthylridine ring in the acrylonitrile polymer, though it may be dependent on the kind of amine or alkali, too. Concretely saying, its amount is in the range of 0.01–20% by weight and preferably in the range of 0.01–10% by weight based on the weight of acrylonitrile polymer solution, i.e. the total weight of acrylonitrile polymer and solvent.

As the conditions for the plasma treatment of semipermeable membrane, the conditions mentioned in Japanese Patent Publication No. 38,988/77 may be employed, for example. Specifically, a gas such as hydrogen, helium, argon, nitrogen, oxygen, carbon monoxide, carbon dioxide, ammonia or the like is introduced into such an evacuated vessel as shown in FIG. 1 of the gasette of the above-mentioned patent so that pressure in the vessel reaches 0.01–10 Torr and then a voltage of 0.5–50 KV of an alternating or direct current is applied between the electrodes, whereby a plasma is generated. The time period of the treatment is preferably in the range of 5 seconds to 600 minutes.

As has been mentioned above, the characteristic feature of the present invention consists in that flux of semipermeable membrane can be increased without damaging its solute permeability by dipping a semipermeable membrane of acrylonitrile polymer in a solution of an amine and/or an alkali, or by treating the membrane with plasma after the dipping treatment, or, when a semipermeable membrane of acrylonitrile polymer is produced by wet casting process, by adding an amine and/or an alkali to the casting solution or by treating the semipermeable membrane thus obtained with plasma.

The semipermeable membrane obtained by the process of the present invention is remarkably increased in flux as compared with hitherto known acrylonitrile polymer type semipermeable membranes without damaging solute rejection. Therefore, it has a great economical effect and is practically usable in various industries.

That is, the semipermeable membranes obtained by the process of the present invention can extensively be used for separation and concentration of substances by reverse osmosis, ultrafiltration or the like, and more concretely for production of fresh water from sea water, treatment of waste water, concentration of fruit juices, separation of nonaqueous fluids and other processes.

Further, the effect of the present invention can also be exhibited by combining the present invention with other treatments such as the dipping in aqueous solution of inorganic salt mentioned in Japanese Patent Kokai (Laid-Open) No. 123,583/79, or the dipping treatment in protic acid mentioned in Japanese Patent Kokai (Laid-Open) No. 130,482/79, or the treatment with hot water mentioned in Japanese Patent Application No. 155,919/78, or other inventions. Such combinations are also involved in the scope of the present invention.

The present invention will be illustrated more concretely with reference to the following examples which are presented in no limitative way.

In the examples, solute rejection is a quantity defined by the following equation:

$$\text{Solute rejection (\%)} = \left(1 - \frac{\text{the concentration of solute in permeated solution}}{\text{the concentration of solute in feed solution}}\right) \times 100$$

EXAMPLE 1

A copolymer consisting of 89% by mole of acrylonitrile and 11% by mole of methyl acrylate was synthesized according to the known process. After dissolving 20 parts of the copolymer into a solvent mixture consisting of 70 parts of N,N-dimethylformamide and 10 parts of foramide, the resulting solution was cast on a glass plate heated to 40° C. so that thickness of the solution reached 250μ. After an evaporating period of one minute, the glass plate was thrown into water kept at 10° C. for the sake of gelation. Two hours later, the membrane released from the glass plate was taken out and dried at room temperature for 24 hours. Thickness of the membrane was 100μ. Its bubbling point was 32 kg/cm². After dipping the membrane in amine or alkali under the treating conditions shown in Table 1 and then washing it with water, it was dried at room temperature for 24 hours. Then, it was treated with plasma according to the method mentioned in Japanese Patent Publication No. 38,988/77, i.e. in a plasma treatment apparatus made from a bell jar having one pair of electrodes inside, to produce a plasma-treated membrane.

Conditions of the plasma treatment were as follows:

| | |
|---|---|
| Gas | Helium |
| Degree of vacuum | 0.2 Torr |
| Discharge voltage | 3 KV |
| Discharge current | 25 mA |
| Treating time | 40 minutes. |

Then, the membrane as attached to a circulation type of reverse osmosis apparatus (effective membrane area: 13.0 cm²) conventionally used in laboratories, and tested on permeation of aqueous sodium chloride solution (0.5% by weight). Thus, under a pressure of 50 kg/cm², an aqueous sodium chloride solution having a temperature of 25° C. was supplied to the cell at a rate of 630 ml/minute, and flux and salt rejection were measured 24 hours after the start of experiment. The results obtained were as shown in Table 1. An increase in flux was produced by the dipping treatement in amine or alkali.

TABLE 1

| | Treatment with amine or alkali | | | | | | |
|---|---|---|---|---|---|---|---|
| | Kind | Solvent | Concentration (% by wt.) | Temperature of treatment (°C.) | Time of treatment (hr) | Flux (LMH)[1] | Salt rejection (%) |
| 1 | — | — | — | — | — | 4.6 | 97.1 |
| 2 | Monoethanolamine | Methanol | 20 | 45 | 6 | 10.3 | 97.8 |
| 3 | Triethylamine | Methanol | 10 | 45 | 20 | 11.5 | 97.6 |
| 4 | Triethylamine | Methanol | 10 | 45 | 30 | 12.1 | 97.7 |
| 5 | n-Butylamine | Ethanol | 15 | 45 | 10 | 11.8 | 98.0 |
| 6 | Cyclohexylamine | Methanol | 10 | 30 | 10 | 10.7 | 97.3 |
| 7 | Diphenylamine | Isopropanol | 10 | 45 | 24 | 9.6 | 96.8 |
| 8 | Potassium hydroxide | Methanol | 0.7 | 45 | 10 | 10.3 | 98.1 |

TABLE 1-continued

| | Treatment with amine or alkali | | | | | |
|---|---|---|---|---|---|---|
| Kind | Solvent | Concentration (% by wt.) | Temperature of treatment (°C.) | Time of treatment (hr) | Flux (LMH)[1] | Salt rejection (%) |
| 9 Sodium hydroxide | Methanol | 0.005 | 45 | 10 | 10.7 | 98.0 |

[1]LMH = liter/m² · hr

EXAMPLE 2

A copolymer consisting of 90% by mole of acrylonitrile and 10% by mole of vinyl acetate was synthesized by the well-known process.

After dissolving 21 parts of the copolymer into a solvent mixture consisting of 69 parts of N,N-dimethylformamide and 10 parts of formamide, the resulting solution was cast on a glass plate at a room temperature of 25° C. so that thickness of the cast solution reached 250μ. After evaporation for one minute, the glass plate was thrown into water kept at 17° C. for the sake of gelation. Two hours later, the membrane released from glass plate was taken out and dried at room temperature for 24 hours. Bubbling point of the membrane was 35 kg/cm². After dipping the membrane in amine or alkali under the conditions shown in Table 2, it was washed with water and dried at room temperature. Thickness of the membrane was 100μ.

The membranes thus obtained were tested for salt rejection in the same manner as in Example 1. The results are shown in Table 2, which demonstrate that flux of membranes increases when the membranes are subjected to dipping treatment with amine or alkali.

TABLE 2

| | Treatment with amine or alkali | | | | | |
|---|---|---|---|---|---|---|
| Kind | Solvent | Concentration (% by wt.) | Temperature of treatment (°C.) | Time of treatment (hr) | Flux (LMH) | Salt rejection (%) |
| 1 — | — | — | — | — | 4.0 | 0 |
| 2 Monoethanolamine | Methanol | 20 | 25 | 48 | 12.6 | 6.0 |
| 3 Potassium hydroxide | Methanol | 0.6 | 45 | 20 | 11.8 | 7.2 |
| 4 Triethylamine | Methanol | 20 | 45 | 20 | 12.0 | 6.8 |

EXAMPLE 3

A copolymer consisting of 89% by mole of acrylonitrile and 11% by mole of methyl acrylate was synthesized by the well-known process. After dissolving 20 parts of the copolymer into a solvent mixture consisting of 70 parts of N,N-dimethylformamide and 10 parts of formamide, an amine or an alkali was added as shown in Table 3 and the resulting mixture was allowed to stand at 80° C. for 4 hours. While keeping the temperature, the solution was cast on a glass plate heated to 40° C. so that thickness of the cast solution reached 250μ. After evaporation for 11 minutes, the glass plate was thrown into water kept at 10° C. for the sake of gelation. Two hours later, the membrane released from the glass plate was taken out and dried at room temperature for 24 hours. Thickness of the membrane was 100μ. Then, a plasma-treated membrane was prepared under the same plasma-treatment conditions as in Example 1. The membranes were tested for salt rejection in the same manner as in Example 1. The results are shown in Table 3. Flux was increased by the addition of amine or alkali.

TABLE 3

| | Amine or alkali added | | Flux[*2] | Salt rejection |
|---|---|---|---|---|
| | Kind | Amount[*1] | (LMH) | (%) |
| 1 | — | — | 4.6 | 97.1 |
| 2 | Monoethanolamine | 0.5 | 10.5 | 97.7 |
| 3 | Triethylamine | 0.3 | 11.6 | 96.8 |
| 4 | Triethylamine | 0.4 | 12.1 | 97.5 |
| 5 | n-Butylamine | 0.2 | 11.3 | 98.0 |
| 6 | Cyclohexylamine | 1.0 | 12.4 | 98.1 |
| 7 | Diphenylamine | 2.0 | 10.2 | 97.3 |
| 8 | Potassium hydroxide | 1.0 | 11.8 | 97.9 |
| 9 | Sodium hydroxide | 1.0 | 11.2 | 97.7 |

[*1]Percent by weight based on (acrylonitrilemethyl acrylate copolymer + dimethylformamide + formamide)
[*2]LMH = liter/m² · hr

EXAMPLE 4

A copolymer consisting of 90% by mole of acrylonitrile and 10% by mole of vinyl acetate was synthesized by the well-known process.

After dissolving 21 parts of the copolymer into a solvent mixture consisting of 69 parts of N,N-dimethylformamide and 10 parts of formamide, amine or alkali was added as shown in Table 4, and the resulting mixture was allowed to stand at 80° C. for 4 hours. While keeping the temperature, the solution was cast on a glass plate heated to 40° C. so that thickness of the cast solution reached 250μ. After evaporation for one minute, the glass plate was thrown into water kept at 17° C. for the sake of gelation. Two hours later, the membrane released from the glass plate was taken out and dried at room temperature for 24 hours. Thickness of the membrane was 100μ.

The membranes thus obtained were tested for salt rejection in the same manner as in Example 1. The results are shown in Table 1. Flux of membrane is increased by the addition of amine or alkali.

TABLE 4

| | Amine or alkali added | | Flux | Salt rejection |
|---|---|---|---|---|
| | Kind | Amount | (LMH) | (%) |
| 1 | — | — | 4.0 | 0 |
| 2 | Monoethanolamine | 0.5 | 11.7 | 5.8 |
| 3 | Triethylamine | 0.3 | 13.1 | 5.4 |
| 4 | Potassium hydroxide | 0.2 | 12.5 | 6.7 |

EXAMPLE 5

A membrane was prepared in the same manner as in Example 4. It was attached to a circulation type of reverse osmosis apparatus (effective membrane area: 13.0 cm$^2$) usually employed in laboratories, and tested for permeation of 0.5% (by weight) aqueous solution of potassium ferricyanide. Thus, under a pressure of 50 kg/cm$^2$, an aqueous solution of potassium ferricyanide kept at 25° C. was supplied to the cell at a rate of 630 ml/minute, and flux and salt rejection were measured 24 hours after the start of experiment. The results obtained were as shown in Table 5. It is known from the table that flux of membrane is increased by the dipping treatment with amine or alkali.

TABLE 5

| | Amine or alkali added | | Flux | Salt rejection |
|---|---|---|---|---|
| | Kind | Amount*[1] | (LMH) | (%) |
| 1 | — | — | 3.9 | 94.3 |
| 2 | Monoethanolamine | 0.5 | 11.2 | 97.6 |
| 3 | Triethylamine | 0.3 | 12.7 | 97.2 |
| 4 | Potassium hydroxide | 0.2 | 11.8 | 98.1 |

*[1]The same as in Table 4.

What is claimed is:

1. A process for producing a semipermeable membrane which comprises dipping a semipermeable membrane of acrylonitrile polymer containing 40–100% by mole of acrylonitrile in a solution of sodium hydroxide or potassium hydroxide and thereafter treating it with plasma.

2. A process for producing a semipermeable membrane which comprises using, as casting solution, a solution containing sodium hydroxide or potassium hydroxide when a semipermeable membrane of acrylonitrile polymer containing 40–100% by mole of acrylonitrile is produced by wet casting process, and then subjecting the resulting semipermeable membrane to a plasma treatment.

* * * * *